United States Patent
Kang et al.

(10) Patent No.: US 9,620,781 B2
(45) Date of Patent: Apr. 11, 2017

(54) ELECTRODE BINDER FOR SECONDARY BATTERY PROVIDING EXCELLENT ADHESION STRENGTH AND LIFE CHARACTERISTICS

(71) Applicant: LG Chem, Ltd., Seoul (KR)

(72) Inventors: Min Ah Kang, Daejeon (KR); Young-Min Kim, Daejeon (KR); Eun Joo Park, Daejeon (KR)

(73) Assignee: LG Chem, Ltd. (KR)

( * ) Notice: Subject to any disclaimer, the term of this patent is extended or adjusted under 35 U.S.C. 154(b) by 195 days.

(21) Appl. No.: 14/409,582

(22) PCT Filed: Jul. 4, 2013

(86) PCT No.: PCT/KR2013/005929
§ 371 (c)(1),
(2) Date: Dec. 19, 2014

(87) PCT Pub. No.: WO2014/010866
PCT Pub. Date: Jan. 16, 2014

(65) Prior Publication Data
US 2015/0243993 A1    Aug. 27, 2015

(30) Foreign Application Priority Data

Jul. 11, 2012 (KR) .................. 10-2012-0075361
Jul. 11, 2012 (KR) .................. 10-2012-0075369

(51) Int. Cl.
*H01M 4/13* (2010.01)
*H01M 4/58* (2010.01)
*H01M 4/62* (2006.01)
*C08F 212/10* (2006.01)
*C08F 220/46* (2006.01)
*C08F 220/48* (2006.01)
*H01M 10/052* (2010.01)
*H01M 10/0525* (2010.01)

(52) U.S. Cl.
CPC .......... *H01M 4/622* (2013.01); *C08F 212/10* (2013.01); *C08F 220/46* (2013.01); *C08F 220/48* (2013.01); *H01M 4/13* (2013.01); *H01M 4/623* (2013.01); *H01M 10/052* (2013.01); *H01M 10/0525* (2013.01)

(58) Field of Classification Search
CPC ... H01M 4/622; H01M 4/621; H01M 10/0525
See application file for complete search history.

(56) References Cited

U.S. PATENT DOCUMENTS

| | | | |
|---|---|---|---|
| 2006/0058462 A1 | 3/2006 | Kim et al. | |
| 2006/0228627 A1* | 10/2006 | Nakayama | H01M 4/131 429/217 |
| 2007/0055023 A1 | 3/2007 | Han et al. | |
| 2008/0003506 A1 | 1/2008 | Suzuki et al. | |
| 2008/0166633 A1* | 7/2008 | Hwang | H01M 4/0435 429/217 |
| 2011/0003207 A1 | 1/2011 | Oh et al. | |
| 2012/0183848 A1 | 7/2012 | Kang et al. | |
| 2013/0202963 A1 | 8/2013 | Kim et al. | |

FOREIGN PATENT DOCUMENTS

| | | | |
|---|---|---|---|
| CN | 1765025 A | 4/2006 | |
| CN | 101023543 A | 8/2007 | |
| CN | 101926032 A | 12/2010 | |
| CN | 102117914 A | 7/2011 | |
| KR | 2002-0042717 A | 6/2002 | |
| KR | 2004-0078927 A | 9/2004 | |
| KR | 2004-0104400 A | 12/2004 | |
| KR | 2007-0023141 A | 2/2007 | |
| KR | 2006-0100097 | * 4/2008 | H01M 4/62 |
| KR | 20080034219 A | 4/2008 | |
| KR | 100845702 B1 | 7/2008 | |
| WO | 2011105687 A2 | 9/2011 | |
| WO | 2011159057 A2 | 12/2011 | |

OTHER PUBLICATIONS

International Search Report from PCT/KR2013/005929, dated Oct. 18, 2013.

* cited by examiner

*Primary Examiner* — Patrick Ryan
*Assistant Examiner* — Julian Anthony
(74) *Attorney, Agent, or Firm* — Lerner, David, Littenberg, Krumholz & Mentlik, LLP

(57) ABSTRACT

Disclosed is a binder for a secondary battery electrode including a copolymer of a hydrophilic monomer and a hydrophobic monomer, wherein, when a concentration of the copolymer is 5% in a solution based upon NMP as a solvent, a viscosity of the solution including the copolymer is 800 cP to 10000 cP. By using the binder, stability of an electrode is fundamentally improved from an electrode preparation process and, as such, a secondary battery having excellent lifespan characteristics is provided.

12 Claims, No Drawings

ELECTRODE BINDER FOR SECONDARY BATTERY PROVIDING EXCELLENT ADHESION STRENGTH AND LIFE CHARACTERISTICS

CROSS REFERENCE TO RELATED APPLICATION

This application is a national phase entry under 35 U.S.C. §371 of International Application No. PCT/KR2013/005929, filed Jul. 4, 2013, which claims priority to Korean Patent Application No. 10-2012-0075361, filed on Jul. 11, 2012 and Korean Patent Application No. 10-2012-0075369, filed on Jul. 11, 2012, the disclosures of which are incorporated herein by reference.

TECHNICAL FIELD

The present invention relates to a binder for a secondary battery electrode. More particularly, the present invention relates to a binder for a secondary battery electrode including a copolymer of a hydrophilic monomer and a hydrophobic monomer, wherein, when a concentration of the copolymer is 5% in a solution based upon NMP as a solvent, a viscosity of the solution including the copolymer is 800 cP to 10000 cP.

BACKGROUND ART

In line with rapid increase in use of fossil fuels, demand for alternative energy or clean energy is increasing. Thus, the field of power generation and electricity storage that use electrochemical reaction is most actively studied.

As a representative example of electrochemical devices using electrochemical energy, secondary batteries are currently used and use thereof is gradually expanding.

Recently, as technology for portable devices, such as portable computers, portable phones, cameras, and the like, continues to develop and demand therefor continues to increase, demand for secondary batteries as energy sources is rapidly increasing. Among these secondary batteries, research on lithium secondary batteries having high energy density, high operating potential, long cycle lifespan and low self-discharge rate has been underway and such lithium secondary batteries are commercially available and widely used.

In addition, as interest in environmental problems is increasing, research into electric vehicles, hybrid electric vehicles, and the like that can replace vehicles using fossil fuels, such as gasoline vehicles, diesel vehicles, and the like, which are one of the main causes of air pollution, is underway. As a power source of electric vehicles, hybrid electric vehicles, and the like, nickel-metal hydride secondary batteries are mainly used. However, research into lithium secondary batteries having high energy density and high discharge voltage is actively carried out and some of the lithium secondary batteries are commercially available.

A binder is used to provide adhesive strength or binding strength between electrode active materials, and between an electrode active material and an electrode collector. To improve adhesive strength between an electrode collector and an electrode active material, a large amount of a binder is required. However, due to such large amount of binder, capacity and conductivity of an electrode may be reduced.

On the other hand, when a small amount of a binder is used, adhesive strength is not sufficient, and, as such, an electrode may be peeled in processes such as drying, pressing and the like of an electrode and thereby quality defect ratios of electrodes may be increased. In addition, when adhesive strength of an electrode is low, the electrode may be peeled by external shock and thereby battery performance may be deteriorated. In particular, when an electrode is peeled, contact resistance between an electrode material and a collector is increased and, as such, output performance of an electrode may be deteriorated.

Thus, there is an urgent need in the art to study a binder and an electrode material that may have strong adhesive strength so as to prevent separation between electrode active material components or separation between an electrode active material and a current collector when manufacturing an electrode and may have strong physical properties so as to achieve structural stability of an electrode by controlling volume expansion of an electrode active material caused as charging and discharging are repeated and, accordingly, enhance battery performance.

A conventional organic solvent-based binder, i.e., polyvinylidene fluoride (PVdF), does not meet such requirement and thus, recently, a method of using binders prepared by preparing emulsion particles by aqueous polymerization of styrene-butadiene rubber (SBR) and mixing the emulsion particles with a viscosity controlling agent and the like has been proposed and is currently commercially available. These binders are eco-friendly and used in a small amount and thus may increase battery capacity.

However, a viscosity controlling agent such as carboxymethyl cellulose deteriorates battery processability due to high inflexibility while having high viscosity and stability. In addition, the viscosity controlling agent increases electric resistance and, as such, lifespan characteristics are deteriorated.

Therefore, there is an urgent need to develop a binder that enhances lifespan characteristics of a battery, imparts structural stability to an electrode, and has high adhesive strength.

DISCLOSURE

Technical Problem

The present invention aims to address the aforementioned problems of the related art and to achieve technical goals that have long been sought.

As a result of a variety of extensive and intensive studies and experiments, the inventors of the present invention developed, as described below, a binder for a secondary battery electrode including a copolymer of a hydrophilic monomer and a hydrophobic monomer having a predetermined viscosity, and confirmed that, when such a binder for an electrode is used in a secondary battery, excellent adhesive strength may be provided and lifespan characteristics may be improved, thus completing the present invention.

Technical Solution

In accordance with one aspect of the present invention, provided is a binder for a secondary battery electrode including a copolymer, wherein, when a concentration of the copolymer is 5% in a solution based upon NMP as a solvent, a viscosity of the solution including the copolymer is 800 cP to 10000 cP and the copolymer includes a hydrophilic monomer and a hydrophobic monomer.

The binder for an electrode according to the present invention includes a copolymer of a hydrophilic monomer and a hydrophobic monomer having a predetermined viscosity, and thereby, without using a viscosity controlling agent in a battery manufacturing process, a binder for an electrode, which is flexible and has high viscosity, may be provided.

The viscosity of the copolymer may be controlled with a variety of factors such as a type, a molecular weight and the like of a monomer constituting the copolymer. For example, the viscosity of the copolymer may be obtained in the above range in a predetermined solution based on weight, by selectively controlling polymerization degree and the like in exemplary monomers described below.

In the present invention, viscosity is generally measured with a viscometer after placing copolymer in a container.

A viscosity of a solution including the copolymer may be 30 cP to 700 cP, particularly 50 cP to 500 cP, when a concentration of the copolymer is 5% in a solution based upon NMP as a solvent.

In addition, a viscosity of a solution including the copolymer may be 800 cP to 10000 cP, particularly 1000 cP to 5000 cP, when a concentration of the copolymer is 5% in a solution based upon NMP as a solvent, as described above.

As one embodiment, the copolymer may include (A) at least one monomer selected from the group consisting of monomers including a nitrile group in a range of 70 to 99 wt % based on the total weight of a binder, and (B) at least one monomer selected from the group consisting of monomers including a carboxylic acid group and an amide group in a range of 1 to 30 wt %.

As described in Experimental Examples below, the amount of monomer included in the copolymer was determined to exhibit optimal adhesive strength and like, and thus the amount of a monomer outside the above range is not preferable.

The nitrile-based monomer may be, for example, at least one selected the group consisting of a monomer group having a double bond including succinonitrile, sebaconitrile, nitrile fluoride and nitrile chloride, acrylonitrile, and methacrylonitrile, but the present invention is not limited thereto.

A monomer including the carboxylic acid group and the amide group may be, for example, at least one selected the group consisting of an unsaturated monocarboxylic acid monomer such as acrylic acid, methacrylic acid, crotonic acid, isocrotonic acid and the like, an unsaturated dicarboxylic acid monomer such as maleic acid, fumaric acid, cytraconic acid, mesaconic acid, glutaconic acid, inaconic acid and the like, and an acid anhydride thereof, acrylamide, n-methylolacrylamide, n-butoxymethyl acrylamide, and methacrylamide, or a mixture thereof.

More preferably, a monomer including the nitrile group may be acrylonitrile and a monomer including the carboxylic acid group and the amide group may be acrylic acid. In this case, copolymers of the acrylonitrile and the acrylic acid may have a tensile strain of 5 to 100%.

As desired, the copolymer may further include a (meth) acrylic ester-based monomer, a conjugated diene monomer, and/or a vinyl-based monomer. In this case, the amount of the added monomer may be in a range of 0.1 to 20 wt % based on the total amount of a monomer.

The (meth)acrylic ester-based monomer may be, for example, at least one monomer selected the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethyl hexyl acrylate, hydroxy propyl acrylate, lauryl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethyl hexyl methacrylate, 2-ethyl hexyl methacrylate, hydroxy ethyl methacrylate, and hydroxy propyl methacrylate.

The conjugated diene monomer may be, for example, at least one monomer selected the group consisting of 1,3-butadiene, isoprene, 2,3-dimethyl-1,3-butadiene and 1,3-pentadiene.

The vinyl-based monomer may be, for example, at least one monomer selected the group consisting of styrene, o-, m- and p-methylstyrene, α-methylstyrene, β-methylstyrene, 2,4-dimethylstyrene, o-, m-, and p-ethylstyrene, p-t-butylstyrene, divinylbenzene and vinylnaphthalene.

The binder for an electrode according to the present invention may be prepared, for example, through emulsion polymerization, suspension polymerization, precipitation polymerization and solvent polymerization, using the monomers. Polymerization temperature and polymerization time may be properly determined according to a polymerization method or a polymerization initiator. For example, polymerization temperature may be approximately 50 to 200 and polymerization time may be approximately 1 to 20 hours.

As a polymerization initiator, inorganic or organic peroxide may be used and, for example, a water-soluble initiator including potassium persulfate, sodium persulfate, ammonium persulfate and the like, and an oil-soluble initiator including cumene hydroperoxide, benzoyl peroxide and the like may be used. In addition, to promote initiation reaction of a peroxide, an activator in addition to the polymerization initiator may be further included. As the activator, at least one selected from the group consisting of sodium formaldehyde sulfoxylate, sodium ethylene diaminotetraacetate, ferrous sulfate and dextrose may be used.

In the present invention, the binder for an electrode may be a binder for a cathode and/or a binder for an anode.

The binder for a cathode and the binder for an anode satisfy requirements of the binder for an electrode described above. Particularly, the viscosity of a 2% solution of the binder for a cathode may be 70 cP to 300 and the viscosity of a 5% solution thereof may be 1600 cP to 4500 cP, and the viscosity of a 2% solution of the binder for an anode may be 50 cP to 300 cP and the viscosity of 5% solution thereof may be 1300 cP to 4900 cP.

The present invention provides an electrode for a secondary battery, wherein an electrode active material and a conductive material bind to a collector by the binder for an electrode. Here, the electrode may be a cathode and/or an anode.

In particular, a cathode for a secondary battery is provided, wherein, by the binder for a cathode, a cathode active material and a conductive material bind to a collector.

The cathode may be prepared by adding the binder for a cathode and the cathode active material and the conductive material to a predetermined solvent such as water, NMP and the like to prepare a slurry, and then by drying and pressing a collector after coating the slurry on the collector. The cathode active material will be described in more detail below.

Regarding an anode, an anode for a secondary battery is provided, wherein an anode active material and a conductive material bind to a collector by the binder for an anode.

The cathode active material as a lithium transition metal oxide includes two or more transition metals and, for example, may be a layered compound such as a lithium cobalt oxide ($LiCoO_2$), lithium nickel oxide ($LiNiO_2$) and the like substituted with one or more transition metals; lithium manganese oxide substituted with one or more transition metals; lithium nickel-based oxide represented by formula, $LiNi_{1-y}M_yO_2$ (where M includes at least one of Co, Mn, Al, Cu, Fe, Mg, B, Cr, Zn and Ga, and $0.01 \leq y \leq 0.7$); a lithium nickel cobalt manganese complex oxide represented by $Li_{1+z}Ni_bMn_cCo_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$ and $b+c+d<1$, M is Al, Mg, Cr, Ti, Si or Y, and A is F, P or Cl) such as $Li_{1+z}Ni_{1/3}Co_{1/3}Mn_{1/3}O_2$, $Li_{1+z}Ni_{0.4}Mn_{0.4}Co_{0.2}O_2$ and the like; an olivine-based lithium metal phosphate by represented by formula $Li_{1+x}M_{1-y}M'_yPO_{4-z}X_z$ (where M is a transition metal, particularly Fe, Mn, Co or Ni, M' is Al, Mg or Ti, X is F, S or N, $-0.5 \leq x \leq +0.5$, $0 \leq y \leq 0.5$, and $0 \leq z \leq 0.1$); and the like, but the present invention is not limited thereto.

The anode active material according to the present invention may be, for example, carbon and graphite materials such as natural graphite, artificial graphite, expandable graphite, carbon fiber, hard carbon, carbon black, carbon nanotubes, fullerene, and activated carbon; metals alloyable with lithium such as Al, Si, Sn, Ag, Bi, Mg, Zn, In, Ge, Pb, Pd, Pt, Ti, and the like and compounds including these elements; complexes of metals and compounds thereof and complexes of carbon and graphite materials; and lithium-containing nitrides. Among these, a carbon-based active material, a silicon-based active material, a tin-based active material, or a silicon-carbon-based active material may be used alone or in a combination of two or more there among.

The conductive material as an ingredient to improve conductivity of an electrode active material may be added in an amount of 0.01 to 30 wt % based on the total weight of an electrode mixture. There is no particular limit as to the conductive material, so long as it does not cause chemical changes in the fabricated secondary battery and has conductivity. Examples of conductive materials include graphite such as natural graphite and synthetic graphite; carbon black such as carbon black, acetylene black, Ketjen black, channel black, furnace black, lamp black, and thermal black; carbon derivatives such as carbon nanotubes and fullerenes; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

An electrode collector is a portion in which electrons move through electrochemical reaction of an active material. In accordance with electrode type, an electrode collector is classified into a cathode collector and an anode collector.

The cathode collector is typically fabricated to a thickness of 3 micrometers to 500 µm. The cathode collector is not particularly limited so long as it does not cause chemical changes in the fabricated secondary battery and has high conductivity. For example, the cathode collector may be made of stainless steel, aluminum, nickel, titanium, sintered carbon, aluminum or stainless steel surface-treated with carbon, nickel, titanium, or silver, or the like.

The anode collector is typically fabricated to a thickness of 3 micrometers to 500 µm. The anode collector is not particularly limited so long as it does not cause chemical changes in the fabricated secondary battery and has conductivity. For example, the cathode collector may be made of copper, stainless steel, aluminum, nickel, titanium, sintered carbon, copper or stainless steel surface-treated with carbon, nickel, titanium, or silver, aluminum-cadmium alloys, or the like.

In particular, the collectors have a thickness of 3 to 200 micrometers and may be used in any of various forms including films, sheets, foils, nets, porous structures, foams, and non-woven fabrics.

As desired, a mixture (electrode mixture) of an electrode active material, a conductive material, a binder and the like may further include a filler.

The filler is used as a component to inhibit cathode expansion and is optionally used. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The present invention also provides a lithium secondary battery including the electrode for a secondary battery.

Generally, the lithium secondary battery further includes a separator and a lithium salt-containing non-aqueous electrolyte in addition to an electrode.

The separator is disposed between the cathode and the anode and an insulating thin film having high ion permeability and mechanical strength is used as the separator. The separator typically has a pore diameter of 0.01 to 10 micrometers and a thickness of 5 to 300 micrometers. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of a non-aqueous electrolyte and a lithium salt.

The non-aqueous electrolyte may be, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

The lithium salt is a material that is readily soluble in the non-aqueous electrolyte. Examples thereof include LiCl, LiBr, LiI, $LiClO_4$, $LiBF_4$, $Li_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

As desired, an organic solid electrolyte, an inorganic solid electrolyte and the like may be used.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

The secondary battery according to the present invention may be used as power supply of electric vehicles, hybrid electric vehicles, power storage devices and the like requiring characteristics of, in particular, long cycle and long lifespan.

MODE FOR INVENTION

Now, the present invention will be described in more detail with reference to the accompanying drawings. These examples are provided for illustrative purposes only and should not be construed as limiting the scope and spirit of the present invention.

Example 1

95 g of acrylonitrile and 5 g of acrylamide as monomers, and potassium persulfate as a polymerization initiator were added to water, and then mixed. Subsequently, the mixture was polymerized at 70 for approximately 5 hours to prepare a binder for a secondary battery electrode (anode and/or cathode).

Example 2

A binder for a secondary battery electrode (anode and/or cathode) was prepared in the same manner as in Example 1, except that, as a monomer, acrylic acid was used instead of acrylamide.

Example 3

A binder for a secondary battery electrode (anode and/or cathode) was prepared in the same manner as in Example 1, except that, as monomers, 90 g of acrylonitrile and 10 g of acrylic acid were used.

Example 4

A binder for an anode of a secondary battery was prepared in the same manner as in Example 1, except that, as monomers, 90 g of acrylonitrile and 10 g of acrylamide were used.

Example 5

A binder for an anode of a secondary battery was prepared in the same manner as in Example 1, except that, as monomers, 5 g of styrene was additionally used.

Example 6

A binder for a cathode of a secondary battery was prepared in the same manner as in Example 1, except that, as monomers, methacrylic acid was used instead of acrylamide.

Example 7

A binder for a cathode of a secondary battery a monomer was prepared in the same manner as in Example 1, except that, as monomers, 5 g of butylacrylate was additionally used.

Comparative Example 1

A binder for a secondary battery electrode (anode and/or cathode) was prepared in the same manner as in Example 1, except that the amount of polymerization initiator was tripled and polymerization was conducted at 80 for approximately 5 hours.

Comparative Example 2

A binder for a secondary battery electrode (anode and/or cathode) was prepared in the same manner as in Example 1, except that the amount of a polymerization initiator was cut in half and polymerization was conducted at 60.

Comparative Example 3

A binder for a secondary battery electrode (anode and/or cathode) was prepared in the same manner as in Example 1, except that, as a monomer, only acrylonitrile was used.

Comparative Example 4

As a binder for a secondary battery electrode (anode and/or cathode), polyvinylidene fluoride was prepared.

Experimental Example 1

Measurement of Viscosity

A 2% solution and a 5% solution were prepared by dissolving the binder for a secondary battery electrode according to the present invention in NMP. The viscosities of the prepared solutions were measured and are summarized in Table 1 below.

TABLE 1

|  | 2% (cP) | 5% (cP) |
| --- | --- | --- |
| Example 1 | 210 | 4020 |
| Example 2 | 90 | 1650 |
| Example 3 | 150 | 3200 |
| Example 4 | 280 | 4850 |
| Example 5 | 50 | 1350 |
| Example 6 | 110 | 2805 |
| Example 7 | 70 | 1750 |
| Comparative Example 1 | 20 | 780 |
| Comparative Example 2 | 805 | 13000 |
| Comparative Example 3 | 60 | 1500 |
| Comparative Example 4 | 10 | 110 |

Experimental Example 2

Test of Anode Adhesive Strength

Using each of the binders for a secondary battery anode according to the present invention, adhesive strength between an electrode active material and a collector was measured.

First, using each of the binders prepared according to the Examples and Comparative Examples, an anode active material (silicon-carbon-based active material), a conductive material, and the binder were mixed in a ratio of 95:1:4 to prepare a slurry. Subsequently, the slurry was coated on Cu foil, and the coated foil was dried for thirty minutes in an oven at 130 and then for twelve hours at 110, resulting in an anode. The prepared anode was pressed and then a surface of the anode was cut and fixed to a glass slide. Subsequently, 180° peel strength was measured while peeling the collector. Results are summarized in Table 2 below. Evaluation was performed by measuring the peel strength of each anode at least five times and obtaining an average value thereof.

TABLE 2

| | Electrode adhesive strength (gf/cm) |
|---|---|
| Example 1 | 90 |
| Example 2 | 184 |
| Example 3 | 280 |
| Example 4 | 191 |
| Example 5 | 126 |
| Comparative Example 1 | 16 |
| Comparative Example 2 | 110 |
| Comparative Example 3 | 27 |
| Comparative Example 4 | 45 |

As shown in Table 2, it can be confirmed that the electrodes using the binders prepared according to examples of the present invention exhibit higher adhesive strength, when compared to the electrodes using the binders of Comparative Examples.

Experimental Example 3

Test of Cathode Adhesive Strength

Using each of the binders for a secondary battery cathode according to the present invention, adhesive strength between an electrode active material and a collector was measured.

First, using each of the binders prepared according to the Examples and Comparative Examples, a cathode active material (active material mixture of lithium nickel cobalt manganese complex oxide and lithium manganese oxide), a conductive material, and the binder were mixed in a ratio of 92:4:4 to prepare a slurry. Subsequently, the slurry was coated on Al foil, and the coated foil was dried for thirty minutes at 130 and then for twelve hours at 110, resulting in a cathode. The prepared cathode was pressed and then a surface of the cathode was cut and fixed to a glass slide. Subsequently, 180° peel strength was measured while peeling the collector. Results are summarized in Table 3 below. Evaluation was performed by measuring the peel strength of each anode at least five times and obtaining an average value thereof.

TABLE 3

| | Cathode adhesive strength (gf/cm) |
|---|---|
| Example 1 | 25 |
| Example 2 | 27 |
| Example 3 | 35 |

TABLE 3-continued

| | Cathode adhesive strength (gf/cm) |
|---|---|
| Example 6 | 31 |
| Example 7 | 35 |
| Comparative Example 1 | 6 |
| Comparative Example 2 | 25 |
| Comparative Example 3 | 18 |
| Comparative Example 4 | 12 |

As shown in Table 3, it can be confirmed that most of the electrodes using the binders prepared according to examples of the present invention exhibit higher adhesive strength, when compared to the electrodes using the binders of Comparative Examples.

Experimental Example 4

Test of Lifespan Characteristics

A coin-type lithium secondary battery was manufactured using the electrode prepared according to Experimental Example 2 and a lithium metal. Lifespan characteristics of the manufactured coin-type lithium secondary battery were measured by charging at 0.1 C and discharging at 0.1 C, and then charging and discharging fifty times at 1 C, in a range of 0 to 1 V. Results are summarized in Table 4 below.

TABLE 4

| | Initial efficiency (%) | Capacity retention after 50 cycles (%) |
|---|---|---|
| Example 1 | 80.3 | 93 |
| Example 2 | 80.7 | 93.5 |
| Example 3 | 81 | 92.8 |
| Example 4 | 80.1 | 93.1 |
| Example 5 | 79.9 | 92.7 |
| Comparative Example 1 | 79.8 | 85.4 |
| Comparative Example 2 | 77.2 | 88.2 |
| Comparative Example 3 | 80.1 | 90.1 |
| Comparative Example 4 | 79 | 90 |

As shown in Table 3, it can be confirmed that the batteries manufactured according to Examples of the present invention exhibit superior lifespan characteristics, when compared to the batteries manufactured according to Comparative Examples of the present invention. In case of the battery manufactured according to Comparative Example 2, adhesive strength is improved but, due to increased internal resistance, lifespan characteristics are deteriorated, when compared to the batteries manufactured according to Examples. Through Experimental Examples of the present invention, it can be confirmed that, due to a combination of a hydrophilic monomer and a hydrophobic monomer, a hydrophobic monomer is easily dispersed and adhesive strength of a hydrophilic monomer is improved, and, as such, adhesive strength and lifespan characteristics are improved at the same time.

Experimental Example 5

Test of Lifespan Characteristics

A coin-type lithium secondary battery was manufactured using the electrode prepared according to Experimental Example 3 as a cathode and lithium metal as an anode. Lifespan characteristics of the manufactured coin-type lithium secondary battery were measured by charging at 0.1 C, and then charging and discharging fifty times at 1 C, in a range of 3 to 4.2 V. Results are summarized in Table 5 below.

TABLE 5

|  | Initial efficiency (%) | Capacity retention after fifty cycles (%) |
|---|---|---|
| Example 1 | 92.1 | 95.3 |
| Example 2 | 92.4 | 94 |
| Example 3 | 93.0 | 94.6 |
| Example 6 | 92.7 | 94.7 |
| Example 7 | 92.5 | 94 |
| Comparative Example 1 | 91.3 | 91 |
| Comparative Example 2 | 91 | 90 |
| Comparative Example 3 | 93 | 93.5 |
| Comparative Example 4 | 92.5 | 93 |

As shown in Table 5, it can be confirmed that the batteries manufactured according to Examples of the present invention exhibit superior lifespan characteristics, when compared to the batteries manufactured according to Comparative Examples of the present invention. In case of the battery manufactured according to Comparative Example 2, adhesive strength is dramatically improved but, due to increased internal resistance, lifespan characteristics are deteriorated, when compared to the batteries manufactured according to Examples. Through Experimental Examples of the present invention, it can be confirmed that, due to a combination of a hydrophilic monomer and a hydrophobic monomer, a hydrophobic monomer is easily dispersed and adhesive strength of a hydrophilic monomer is improved, and, as such, excellent adhesive strength and lifespan characteristics are achieved.

INDUSTRIAL APPLICABILITY

As described above, a binder for a secondary battery electrode according to the present invention includes a copolymer satisfying a predetermined viscosity condition and, as such, may provide high adhesive strength.

Especially, an active material may be easily dispersed using a binder for a cathode according to the present invention and use of a viscosity controlling agent may be minimized by a binder for an anode of the present invention, and, accordingly, lifespan characteristics of a secondary battery including the binder for a cathode and the binder for an anode may be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A binder for a secondary battery electrode comprising a copolymer of a hydrophilic monomer and a hydrophobic monomer, wherein, when a concentration of the copolymer is 5% in a solution based upon NMP as a solvent, a viscosity of the solution comprising the copolymer is 800 cP to 10000 cP, and
wherein the copolymer is a copolymer of monomers comprising (A) at least one monomer selected from the group consisting of monomers comprising a nitrile group in 70 to 99 wt %, and (B) at least one monomer selected from the group consisting of monomers comprising a carboxylic acid group or an amide group in 1 to 30 wt %, based on a total weight of binder.

2. The binder for a secondary battery electrode according to claim 1, wherein, when a concentration of the copolymer is 2% in a solution based upon NMP as a solvent, a viscosity of the solution comprising the copolymer is 30 cP to 700 cP.

3. The binder for a secondary battery electrode according to claim 1, wherein, when a concentration of the copolymer is 5% in a solution based upon NMP as a solvent, a viscosity of the solution comprising the copolymer is 1000 cP to 5000 cP.

4. The binder for a secondary battery electrode according to claim 1, wherein, when a concentration of the copolymer is 2% in a solution based upon NMP as a solvent, a viscosity of the solution comprising the copolymer is 50 cP to 500 cP.

5. The binder for a secondary battery electrode according to claim 1, wherein the monomer comprising the nitrile group is at least one monomer selected the group consisting of a monomer group having a double bond comprising succinonitrile, sebaconitrile, nitrile fluoride and nitrile chloride, acrylonitrile, and methacrylonitrile.

6. The binder for a secondary battery electrode according to claim 1, wherein the monomer comprising the carboxylic acid group or the amide group is at least one monomer selected the group consisting of an unsaturated monocarboxylic acid monomer such as acrylic acid, methacrylic acid, crotonic acid, isocrotonic acid and the like, an unsaturated dicarboxylic acid monomer such as maleic acid, fumaric acid, cytraconic acid, mesaconic acid, glutaconic acid and inaconic acid, an acid anhydride thereof, acrylamide, n-methylolacrylamide, n-butoxymethyl acrylamide, and methacrylamide.

7. The binder for a secondary battery electrode according to claim 1, wherein the monomer comprising the nitrile group is acrylonitrile, the monomer comprising the carboxylic acid group or the amide group is acrylic acid, and a tensile strain is 5 to 100%.

8. The binder for a secondary battery electrode according to claim 1, wherein the binder for an electrode is a binder for a cathode and/or a binder for an anode.

9. An electrode for a secondary battery, wherein an electrode active material and a conductive material bind to an electrode collector by the binder for a secondary battery electrode according to claim 1.

10. The electrode for a secondary battery according to claim 9, wherein the electrode collector has a thickness of 3 micrometers to 200 micrometers.

11. A lithium secondary battery comprising the electrode for a secondary battery according to claim 10.

12. The electrode for a secondary battery according to claim 9, wherein the electrode is a cathode and/or an anode.

* * * * *